US012326026B2

(12) United States Patent
Wolf et al.

(10) Patent No.: US 12,326,026 B2
(45) Date of Patent: Jun. 10, 2025

(54) DETECTING AND PREVENTING A TRAPPING EVENT

(71) Applicant: MERCEDES-BENZ GROUP AG, Stuttgart (DE)

(72) Inventors: Alexander Wolf, Gerolsheim (DE); Joaquin Rodrigo Pastor, Sindelfingen (DE); Wolfgang Schellhorn, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 153 days.

(21) Appl. No.: 18/285,673

(22) PCT Filed: Feb. 8, 2022

(86) PCT No.: PCT/EP2022/052949
§ 371 (c)(1),
(2) Date: Oct. 5, 2023

(87) PCT Pub. No.: WO2022/214229
PCT Pub. Date: Oct. 13, 2022

(65) Prior Publication Data

US 2024/0110424 A1 Apr. 4, 2024

(30) Foreign Application Priority Data

Apr. 6, 2021 (DE) ..................... 10 2021 001 774.9

(51) Int. Cl.
*E05F 15/46* (2015.01)
*E05F 15/44* (2015.01)

(52) U.S. Cl.
CPC .................................. *E05F 15/443* (2015.01)

(58) Field of Classification Search
CPC ........ E05F 15/46; E05F 15/443; G01V 3/088; G01B 7/023
See application file for complete search history.

(56) References Cited

U.S. PATENT DOCUMENTS 7,202,674 B2 4/2007 Nakano et al.
7,319,301 B2 1/2008 Pribisic
(Continued)

FOREIGN PATENT DOCUMENTS

DE 102004002415 A1 8/2005
DE 102020002817 A1 7/2020
(Continued)

OTHER PUBLICATIONS

Office Action dated Nov. 19, 2024 in related/corresponding JP Application No. 2023-560300.
(Continued)

*Primary Examiner* — Cortez M Cook
(74) *Attorney, Agent, or Firm* — PATENT PORTFOLIO BUILDERS PLLC

(57) ABSTRACT

A device for detecting a trapping event of a motor-actuatable closing system of a vehicle includes sensor and reference sensor electrodes at least partially surrounding the edge of a vehicle opening closable by a closure element. A control unit applies an electrical potential to the sensor electrode for a charging process and a ground potential to the reference sensor electrode for a discharging process. The control unit detects a period of time until a minimum threshold for the electrical potential for the sensor electrode and the reference sensor electrode is reached. A difference between the period of times detected for the sensor and reference sensor electrodes is determined. An imminent trapping event is detected if the difference exceeds a predefined threshold and the period of time detected for the sensor electrode deviates from a predefined standard period of time or a standard period of time detected in a state detected without an imminent trapping event.

10 Claims, 4 Drawing Sheets

(56) References Cited

U.S. PATENT DOCUMENTS

Figure 1:
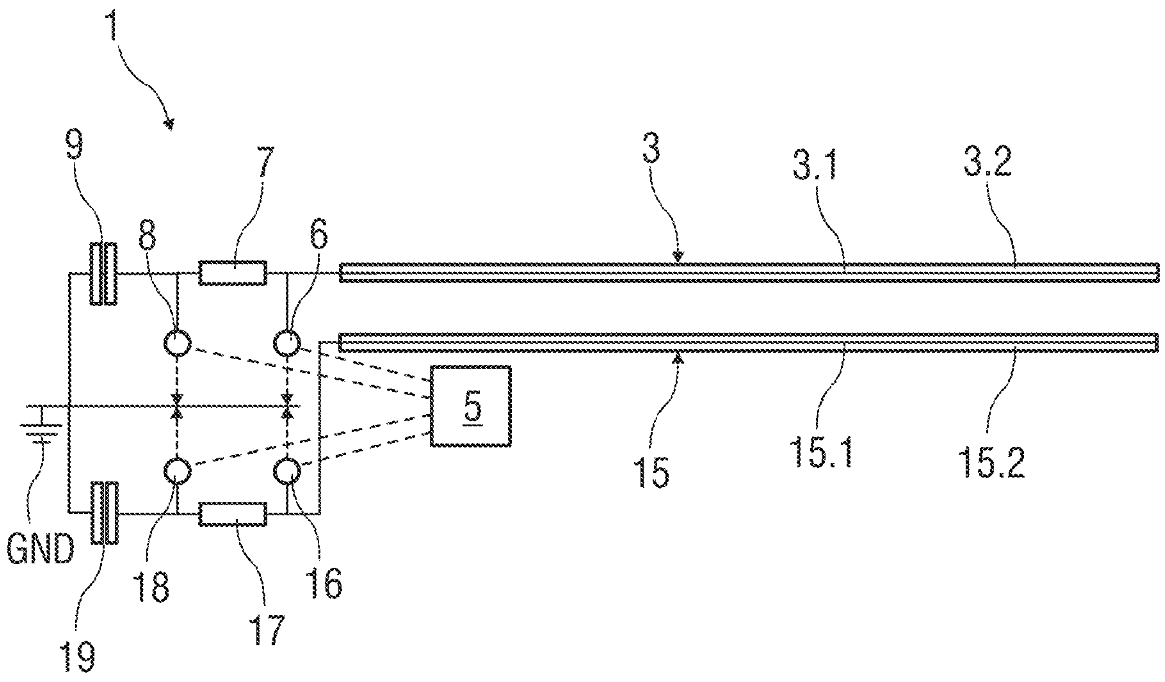

| | | | | |
|---|---|---|---|---|
| 2005/0179445 | A1 | 8/2005 | Nakano et al. | |
| 2007/0183182 | A1 | 8/2007 | Pribisic | |
| 2011/0210755 | A1* | 9/2011 | Ogawa | E05F 15/46 324/686 |
| 2012/0192489 | A1* | 8/2012 | Pribisic | G01V 3/088 324/660 |
| 2015/0330767 | A1* | 11/2015 | Pohl | G01B 7/023 324/671 |

FOREIGN PATENT DOCUMENTS

| | | | |
|---|---|---|---|
| EP | 1154110 | A2 | 11/2001 |
| JP | 2005227244 | A | 8/2005 |
| JP | 2007514938 | A | 6/2007 |
| JP | 2009161968 | A | 7/2009 |
| JP | 2009228294 | A | 10/2009 |

OTHER PUBLICATIONS

International Search Report and Written Opinion mailed May 13, 2022 in related/corresponding International Application No. PCT/EP2022/052949.

* cited by examiner

DETECTING AND PREVENTING A TRAPPING EVENT

BACKGROUND AND SUMMARY OF THE INVENTION

Exemplary embodiments of the invention relate to a device for detecting a trapping event of a motor-actuatable closing system, as well as to a method for operating such a device and to a device for preventing a trapping event of a motor-actuatable closing system of a vehicle.

A device for preventing a trapping event of a motor-actuatable closing system of a vehicle is known from DE 10 2020 002 817 A1. The device comprises a sensor electrode at least partially surrounding the edge of a vehicle opening that can be closed by means of a closure element. Furthermore, the device comprises a microcontroller, a measuring pin coupled to the microcontroller and to the sensor electrode, and a control pin coupled to the microcontroller and, via a high-impedance electrical resistor, to the sensor electrode. The microcontroller is designed to apply an electrical potential to the sensor electrode via the control pin and to simultaneously measure the electrical potential of the sensor electrode and a distribution of negative charges on the sensor electrode at the measuring pin. As soon as the electrical potential measured at the measuring pin reaches a predefined threshold, the microcontroller applies an electrical ground potential on the control pin so that charges flow back from the sensor electrode. Furthermore, the microcontroller is designed to detect a period of time from reaching the threshold up to reaching a minimum threshold of the electrical potential produced by back flow of the charges and to infer that a trapping event is imminent if the detected period of time deviates from a predefined standard period of time or a standard period of time which has been detected in a state without an imminent trapping event.

Furthermore, a device for controlling and monitoring an electrically powered window pane of a motor vehicle that can be moved between an open position and a closed position is known from DE 10 2004 002 415 A1. The device comprises a sensor comprising a sensor electrode that generates an electric field in an opening region of the closure element. The device also comprises a controller connected to the sensor, which controller detects a change in a capacitance of the sensor electrode and a provides a control signal, wherein the controller detects a capacitive change in the sensor electrode due to the presence of a layer of moisture on the closure element.

EP 1 154 110 A2 describes an anti-trap protector for detecting the presence of an object in a sensing region. The anti-trap protector comprises a body portion, a ground electrode embedded in the body portion, and a sensor electrode arranged spaced apart from the ground electrode and is embedded in the body portion. The sensor electrode and the ground electrode are charged to different electrical potentials. The body portion is made from an electrically non-conductive material to insulate the sensor electrode with respect to the ground electrode. The anti-trap protector further comprises a zone of reduced rigidity between the ground electrode and the sensor electrode, wherein the zone of reduced rigidity is arranged in the body portion and is co-extruded together with the body portion. The zone of reduced rigidity is also provided in the form of an air gap in the body portion or in the form of a material having a greater elasticity than that of the body portion, wherein the material having greater elasticity is made from foam rubber. The body portion comprises an electrically conductive region surrounding the sensor electrode, and an electrically conductive region surrounding the ground electrode. In addition, the anti-trap protector comprises a device for producing input signals which are applied to the sensor electrode, and for receiving output signals from the sensor electrode. The device is capable of receiving both output signals, wherein the output signals change as a function of a change in capacitance between the sensor electrode and the ground electrode in the case of the presence of a dielectric object in the sensing region, and the output signals change as a function of a change in capacitance between the sensor electrode and the ground electrode in the case of the presence of a non-conductive object due to a change in the mutual position of the sensor electrode and the ground electrode.

Exemplary embodiments of the invention are directed to a device for detecting a trapping event of a motor-actuatable closing system of a vehicle that is an improvement on the prior art, an improved method for operating such a device, and an improved device for preventing a trapping event of a motor-actuatable closing system of a vehicle.

A device for detecting a trapping event of a motor-actuatable closing system of a vehicle comprises a sensor electrode at least partially surrounding the edge of a vehicle opening that can be closed by means of at least one closure element. In this case, the sensor electrode is arranged in a sealing element at least partially surrounding the opening.

According to the invention, a reference sensor electrode at least partially surrounds the edge of the opening of the vehicle, wherein the reference sensor electrode is arranged spaced apart from the sensor electrode in the sealing element and has a greater spacing from the opening than the sensor electrode. A control unit is designed to apply an electrical potential to the sensor electrode for a charging process and a ground potential to the reference sensor electrode for a discharging process and in each case to detect a period of time until a minimum threshold for the electrical potential for the sensor electrode and the reference sensor electrode is reached, the minimum threshold being produced by a back flow of charges across the ground potential. The control unit is also designed to ascertain a difference between the period of time detected for the sensor electrode and the period of time detected for the reference sensor electrode and then, if the difference exceeds a predefined threshold and if the period of time detected for the sensor electrode deviates from a standard period of time or a standard period of time that has been detected without an imminent trapping event, to infer that a trapping event is imminent.

The device is provided, for example, for use in a vehicle for detecting a trapping event between the closure element and a vehicle structure at least partially surrounding the edge of the closure element. By way of example, this is a motor-actuatable window pane and a vehicle structure at least partially surrounding the edge of a window opening, or a motor-actuatable vehicle door and a vehicle structure at least partially surrounding the edge of the vehicle door vehicle.

Safety requirements for so-called window regulator anti-trap protection in vehicles require a high level of responsiveness that cannot be ensured, for example, by a known current-based anti-trap protector. This is particularly due to the fact that a test object rigidity for testing the anti-trap protection is relatively high at 65 N/mm. This test object represents, for example, properties of a child's finger. The responsiveness of known anti-trap protection systems is also severely limited by a time constant of the system, which describes a period of time from a control of a window regulator motor to a reaction of the window pane. In the case of frame-less vehicle doors, there is in particular the difficulty that guidance of the window pane in the upper block cannot be ensured by freely placeable test object angles and test angle positions. This also applies to door anti-trap protection systems.

By means of the device according to the invention, by contrast a preventive anti-trap protection can be realized, which enables a reaction without the occurrence of a trapping force. This means that it is possible to detect objects and body parts in a window travel course or a door opening and in a critical trapping region, for example near the seal, before a trapping force occurs. Thus, the future safety requirement FMVSS-118 can be complied with. The device can be realized with particularly low material and cost expenditure. The detection is contactless and is particularly robust. A detection range is, for example, 0.5 cm to 5 cm. In particular, an increased robustness compared to capacitive systems is achieved by a continuous recalibration of the discharge time, i.e., the period of time until the minimum threshold of the electrical potential produced by the back flow of the charges is reached. In this case, a very high degree of robustness against moisture and system changes is given. The robustness is also achieved by a possible synchronization with a window pane position and thus a possible activation of the anti-trap protection only in critical regions. It is also not necessary for a trapping object to be coupled to the ground potential.

In the case of devices that only use one active sensor electrode, environmental properties forming a so-called baseline are determined by the same sensor electrode as a slow low-pass value, from which a fast low-pass value is also formed to ascertain a difference value. Thus, it is not possible to distinguish whether changes are caused locally in the trapping region or globally, for example by external electric and magnetic fields. To avoid false detection, a high threshold must thus be predefined and exceeded during the measurement carried out by means of the sensor electrode, resulting in a low sensitivity. Interactions of the sensor electrode with a charge distribution of a vehicle body additionally reduce the possible sensitivity, since stronger field interactions can arise than are caused by the trapped object. Trapped objects, which remain in the trapping region, cannot be detected because of a continual adaptation of the baseline to an existing actual state. In contrast, due to the use of the reference sensor electrode to ascertain the environmental properties and consequently a robust baseline, the present device enables the use of lower thresholds with simultaneously high robustness against false detections. Thus, smaller difference values can be reacted to, resulting advantageously in an increased sensitivity of the device, a reduced inertia in the detection of a trapping event and a reduction in a number of false detections. It is also possible to distinguish between local interactions in the trapping region, which primarily act on one of the electrodes, and an interaction caused by external influences acting on both electrodes, for example interactions of the sensor electrode with the charge distribution of the vehicle body and external electric and magnetic fields. I.e., it is possible to distinguish between local and global events.

In one possible embodiment of the device, the control unit is further designed to carry out the charging process and the discharging process for the sensor electrode and the reference sensor electrode periodically staggered in such a way that the charging process and the discharging process of the sensor electrode are started after the charging process and discharging process of the reference sensor electrode have been completed, or vice versa. Thus, one of the two electrodes is always inactive, so that mutual interference between the electrodes can be effectively and simply prevented during detection of the measurement values.

In one further possible embodiment of the device, the sensor electrode is arranged in an inner sealing lip of the sealing element and the reference sensor electrode is arranged in an outer sealing lip of the sealing element. This enables a simple and protected integration of the two electrodes, whereby the reference sensor electrode is arranged in the vicinity of the sensor electrode, but is not directly directed towards the trapping region and/or arranged in the latter.

In one further possible embodiment of the device, the control unit and the sensor electrode are coupled to a first measuring pin and the control unit and the reference sensor electrode are coupled to a second measuring pin. Furthermore, the control unit is coupled to a first control pin and the sensor electrode is coupled to the first control pin via a high-impedance electrical resistor, and the control unit is coupled to a second control pin and the reference-sensor electrode is coupled to the second control pin via a high-impedance electrical resistor. The control unit is designed to apply the respective electrical potential to the sensor electrode and the reference sensor electrode via the first control pin and the second control pin respectively, to simultaneously measure the electrical potential of the sensor electrode and a distribution of negative charges on the first measuring pin at the sensor electrode, and to simultaneously measure the electrical potential of the reference sensor electrode and a distribution of negative charges on the reference sensor electrode at the second measuring pin. The control unit is further designed to apply the electrical ground potential to the control pins as soon as the electrical potentials measured at the measuring pins reach a respectively predefined threshold so that the charges flow back from the sensor electrode and the reference sensor electrode, and to detect the respective period of time from reaching the threshold up to reaching a respective minimum threshold of the electrical potential for the sensor electrode and the reference sensor electrode produced by the back flow of the charges. This embodiment is distinguished by a simple structure, reliable operation, and a high degree of robustness against interference and can be realized with low material and cost expenditure.

In a further possible embodiment of the device, the sensor electrode and the reference sensor electrode are each coupled to the ground potential via an electric capacitor.

In one further possible embodiment of the device, the sensor electrode and the reference sensor electrode are each designed as a sensor cable with an electrical conductor and an electrical insulator surrounding the latter. This allows a particularly simple, long-lasting, and cost-effective design of the sensor electrode and reference sensor electrode. Furthermore, a simple integration of the two electrodes into the sealing element is therefore possible.

In one further possible embodiment of the device, a shielding electrode for shielding the sensor electrode and the reference sensor electrode from occurring interference is arranged in a vehicle frame element or vehicle roof rail at least partially surrounding the opening. The shielding electrode thereby makes it possible to shield against interference occurring on a side averted from the measuring region and, as a result, to make the device insensitive to interference. By arranging the shielding electrode in the vehicle frame element or vehicle roof rail, a reliable function of the shielding electrode is ensured on the one hand and a simple integration into a vehicle possible on the other hand.

In one further possible embodiment of the device, the control unit is further designed to infer that a trapping event is imminent if, additionally, when the closing movement of the closure element is activated, it is found that the closure element is located in a predefined critical region. Thus, false triggering of an anti-trap protection device can be prevented, in particular if a trapped object is moved from a region between the closure element and the vehicle structure surrounding the latter during the closing movement of the closure element.

In the method according to the invention for operating an above-mentioned device, the electrical potential is applied to the sensor electrode for the charging process and the ground potential is applied to the reference sensor electrode for the discharging process respectively, and in each case a period of time until reaching a minimum threshold of the electrical potential for the sensor electrode and the reference sensor electrode produced by the back flow of the charges across the ground potential is detected. Furthermore, a difference between the period of time detected for the sensor electrode and the period of time detected for the reference sensor electrode is ascertained and if the difference exceeds a predefined threshold and if the period of time detected for the sensor electrode deviates from a predefined standard period of time or a standard period of time in a state without an imminent trapping event, an imminent trapping event is inferred.

Due to the use of the reference sensor electrode for ascertaining the environmental properties and consequently a robust baseline, the method allows the use of lower thresholds and simultaneously leads to a high degree of robustness against false detections. It is thus possible to react to smaller difference values, which advantageously results in an increased sensitivity of the method, a reduced inertia in the detection of a trapping event and a reduction in a number of false detections. It is also possible to distinguish between local interactions in the trapping region, which primarily act on one of the electrodes, and an interaction due to external influences which act on both electrodes, for example interactions of the sensor electrode with the charge distribution of the vehicle body and external electric and magnetic fields. I.e., it is possible to distinguish between local and global events.

The device according to the invention for preventing a trapping event of a motor-actuatable closing system of a vehicle comprises an abovementioned device for detecting a trapping event and at least one control unit for controlling a motor drive of the closure element, wherein the control unit is designed to stop and/or reverse a closing movement of the closure element if a trapping event is imminent. The device enables particularly reliable prevention of trapping events while simultaneously minimizing false detections and false triggering.

Exemplary embodiments of the invention are explained in more detail hereinbelow with reference to drawings.

BRIEF DESCRIPTION OF THE DRAWING FIGURES

Figure 2:
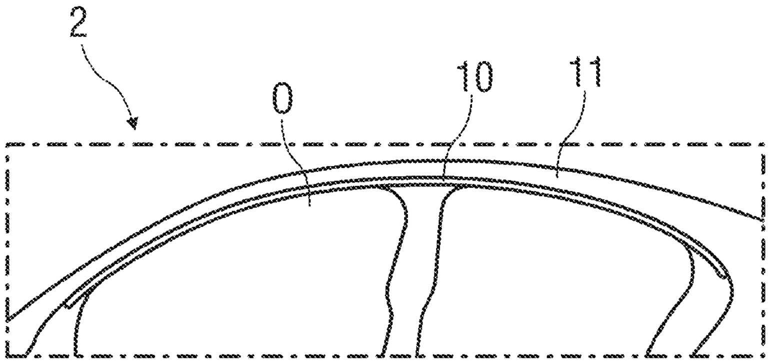
Figure 3:
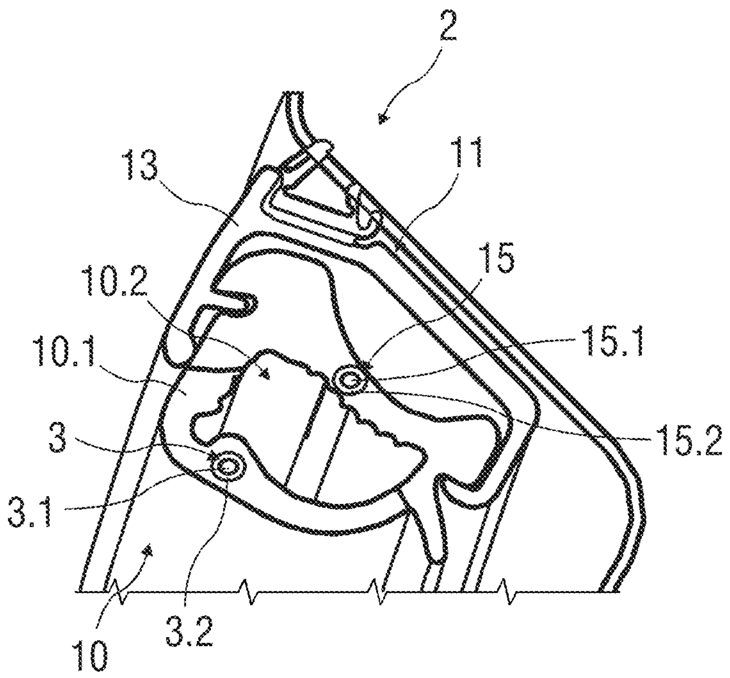
Figure 4:
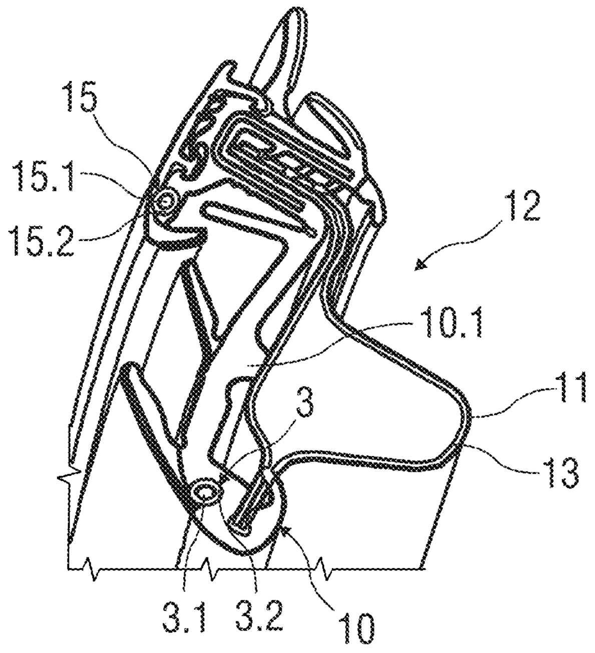
Figure 5:
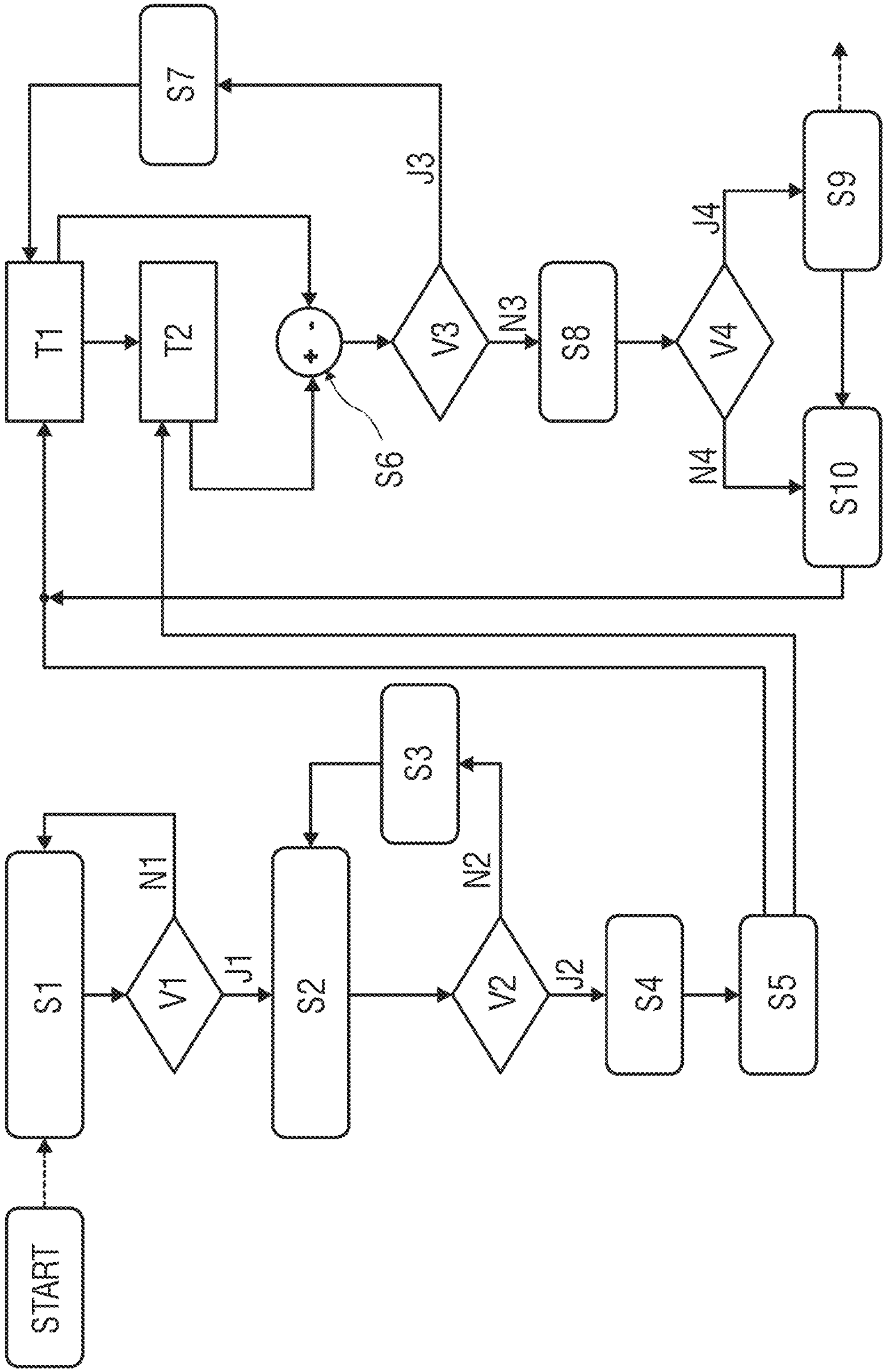
Figure 6:
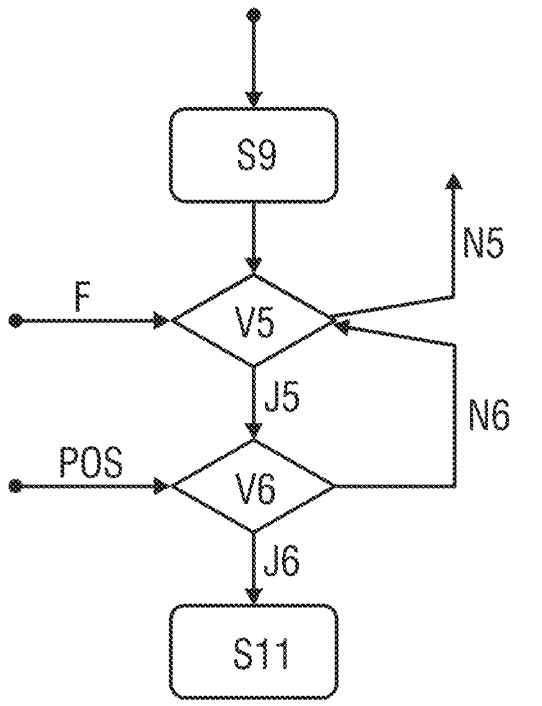
Figure 7:
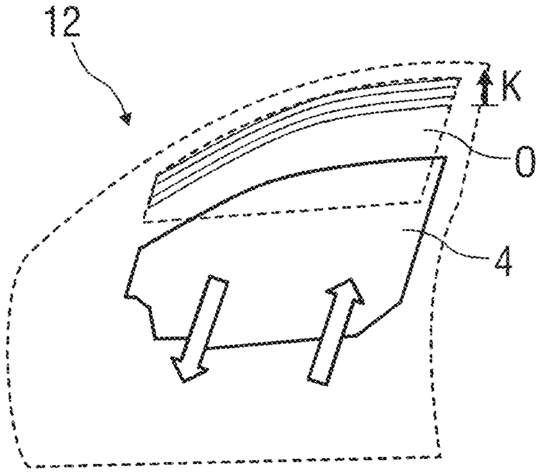

In the drawings:

FIG. 1 schematically shows an electric circuit diagram of a device for detecting a trapping event of a motor-actuatable closing system of a vehicle, FIG. 2 schematically shows a section of a side view of a vehicle, FIG. 3 schematically shows a perspective view of a sectional illustration of a section of the vehicle according to FIG. 2 in the region of a vehicle structure and of a sealing element, FIG. 4 schematically shows a perspective view of a sectional illustration of a section a vehicle door in the region of a sealing element, FIG. 5 schematically shows a flow diagram of a possible exemplary embodiment of a method for detecting a trapping event of a motor-actuatable closing system of a vehicle, FIG. 6 schematically shows a flow diagram of a possible exemplary embodiment of a methods for preventing a trapping event of a motor-actuatable closing system of a vehicle, and FIG. 7 schematically shows a vehicle door with a window opening and a window pane.

Corresponding parts are provided with the same reference signs throughout the figures.

DETAILED DESCRIPTION

FIG. 1 shows an electric circuit diagram of one possible exemplary embodiment of a device 1 for detecting a trapping event of a motor-actuatable closing system of a vehicle 2 that is shown in more detail in FIG. 2.

The device 1 comprises a sensor electrode 3, which at least partially surrounds the edge of a vehicle 2 opening O (shown in FIG. 2) that can be closed by means of at least one closure element 4 (shown in FIG. 7). The sensor electrode 3 has, for example, a length of more than 0.1 m up to 5 m. The device 1 further comprises a reference sensor electrode 15, which likewise at least partially surrounds the edge of the closable opening O of the vehicle 2. In this case, the reference sensor electrode 15 is arranged with a greater spacing from the opening O than the sensor electrode 3.

The sensor electrode 3 and the reference sensor electrode 15 are in this case arranged together in a sealing element 10, which at least partially surrounds the opening O and shown is in more detail in FIGS. 2 to 5.

The device 1 further comprises a control unit 5, for example a microcontroller, a measuring pin 6 coupled to the control unit 5 and the sensor electrode 3, and a control pin 8 coupled to the control unit 5 and, via a high-impedance electrical resistor 7, to the sensor electrode 3.

The device 1 also comprises a measuring pin 16 coupled to the control unit 5 and the reference sensor electrode 15 and a control pin 18 coupled to the control unit 5 and, via a high-impedance electrical resistor 17, to the reference sensor electrode 15.

The sensor electrode 3 and the reference sensor electrode 15 can each be coupled via an electric capacitor 9, 19 to a ground potential GND of the vehicle 2. In exemplary embodiments not shown in more detail, the capacitors 9, 19 can be omitted.

The sensor electrode 3 and the reference sensor electrode 15 are each designed as sensor cables with an electrical conductor 3.1, 15.1 and an electrical insulator 3.2, 15.2 surrounding the latter. The electrical conductors 3.1, 15.1 are, for example, designed as copper conductors and the electrical insulators 3.2, 15.2 for example as plastic or rubber insulation. The sensor cables each have, for example, a diameter of 0.5 mm to 2 mm. In particular, the sensor electrode 3 and the reference sensor electrode 15 are designed identically to make it easier to compare the measurement results detected by them.

The control unit 5 is designed to apply an electrical potential to the sensor electrode 3 via the control pin 8 and simultaneously to measure the electrical potential of the sensor electrode 3 and a resulting distribution of negative charges on the sensor electrode 3 at the measuring pin 6. As soon as the electrical potential measured at the measuring pin 6 reaches a predefined threshold, the control unit 5 applies the electrical ground potential GND to the control pin 8 so that negative charges and positive charges flow back from the sensor electrode 3. Here, the control unit 5 detects a period of time from reaching the threshold up to reaching a minimum threshold of the electrical potential produced by the back flow of the charges.

Furthermore, the control unit 5 is designed to apply an electrical potential to the reference sensor electrode 15 via the control pin 18, analogously to the procedure at the sensor electrode 3, and to simultaneously measure the electrical potential of the reference sensor electrode 15 and a resulting distribution of negative charges on the reference sensor electrode 15 at the measuring pin 16. As soon as the electrical potential measured at the measuring pin 16 reaches a predefined threshold, the control unit 5 applies the electrical ground potential GND to the control pin 18 so that negative charges and positive charges flow back from the reference sensor electrode 15. Here as well, the control unit 5 detects a period of time from reaching the thresholds up to reaching a minimum threshold of the electrical potential produced by the back flow of the charges.

Here, the reference-sensor electrode 15 is used to ascertain environmental properties from which a so-called baseline is formed. This formed baseline represents external global determining factors, i.e., influences that affect both the sensor electrode 3 and the reference sensor electrode 15. These influences are, for example, interactions of the sensor electrode 3 and the reference-sensor electrode 15 with a charge distribution of a vehicle body, external charge distributions, external electric and magnetic fields, etc. In particular, it is assumed here that an external global change is significantly slower than the cycle times of for example ~50 μs that are used.

The charging process and discharging process for the sensor electrode 3 and for the reference sensor electrode 15 are periodically staggered in such a way that the charging process and discharging process of the sensor electrode 3 are started after the charging process and discharging process of the reference sensor electrode 15 have been completed, or vice versa. In other words, one of the two electrodes is always inactive, so that mutual interference between the electrodes can be avoided.

Furthermore, a difference between the period of time detected for the sensor electrode 3 and the period of time detected for the reference sensor electrode 15 is ascertained. If the difference exceeds a predefined threshold and if the period of time detected for the sensor electrode 3 deviates from a predefined standard period of time or a standard period of time detected in a state without an imminent trapping event, the control unit 5 infers that a trapping event is imminent.

This deviation from the standard period of time results from the fact that an external effect of an object, for example a human limb, puts negative charges in the sensor electrode 3 and thus prevents them from flowing back flow and consequently causes inhomogeneities in a charge distribution within the sensor electrode 3.

By comparing the measured values detected by means of the sensor electrode 3 with the baseline, differences, which have a local origin, for example the approach of body parts, can be reliably ascertained. As a result, a high degree of robustness and a more stable detection of local, inertial effects (>50 ms) can be realized. Calibration of the sensor electrode 3 to the surroundings via slow low-pass filters is not necessary.

FIG. 2 shows a section of a side view of a vehicle 2, wherein the vehicle 2 comprises frame-less vehicle doors which are not illustrated. In the case of such vehicle doors, closure elements 4 designed as window panes are sealed by means of at least one sealing element 10, which at least partially surrounds the edge of the opening O, in the present case a window opening, when the vehicle door is in the closed state and when the window pane is in the closed state. In the exemplary embodiment illustrated, the sealing element 10 is arranged on a vehicle structure 11 formed by a roof rail.

FIG. 3 shows a perspective view of a sectional illustration of a section of the vehicle 2 according to FIG. 2 in the region of the vehicle structure 11 designed as a roof rail and of the sealing element 10. In this case, the sealing element 10 is designed as a roof seal with a so-called bubble shape.

To prevent a trapping event between the window pane and the sealing element 10 by detecting an imminent trapping event according to the description relating to FIG. 1, the sensor electrode 3 is arranged in the sealing element 10 completely and directly surrounded by a sealing material 10.1 or alternatively in a cavity 10.2. In particular, the sensor electrode 3 is arranged in an inner sealing lip of the sealing element 10.

Furthermore, the reference sensor electrode 15 is arranged in the sealing element 10 completely and directly surrounded by the sealing material 10.1 or alternatively in the cavity 10.2 in such a way that this has a greater spacing from the opening O than the sensor electrode 3. In this case, the reference sensor electrode 15 is arranged in particular in an outer sealing lip of the sealing element 10.

Furthermore, a shielding electrode 13 for shielding the sensor electrode 3 and the reference sensor electrode 15 from experiencing interference is arranged in the region of the vehicle structure 11 designed as a roof rail. Alternatively, the shielding electrode 13 can also be designed as shielding cable with an electrical conductor, for example a copper conductor, and an electric insulator surrounding the latter, for example a plastic or rubber insulator.

When using the shielding electrode 13, the sensor electrode 3 and the reference sensor electrode 15 are, for example, not coupled to the electrical ground potential GND via the capacitors 9, 19. The shielding electrode 13 is in particular coupled to the ground potential GND and is arranged in particular between the sensor electrode 3 and the edge of the opening O.

The detection of an imminent trapping event takes place in the illustrated exemplary embodiment of the device 1 analogously to the described detection according to FIG. 1, whereby the shielding electrode 13 effects a directed, in particular downwardly directed measuring region and a shielding against interference occurring on a side averted from the measuring region. This makes the device 1 insensitive to interference.

FIG. 4 shows a perspective view of a sectional illustration of a section of a vehicle door 12 in the region of a sealing element 10, whereby the vehicle door 12 is designed as a so-called frame door, the frame of which forms the vehicle structure 11 on which a sealing element 10 is arranged to seal the window pane in the closed state. The sealing element 10 is designed in this case as a frame seal of the frame of the vehicle door 12.

For detecting a trapping event between the window pane and the sealing element 10 by detecting an imminent trapping event according to the description given in relation to FIG. 1, a sensor electrode 3 and a reference sensor electrode 15 are arranged in the sealing element 10 completely and directly surrounded by the sealing material 10.1 or in the cavity 10.2. In this case, the reference sensor electrode 15 is arranged in such a way that this has a greater spacing from the opening O than the sensor electrode 3.

Furthermore, a shielding electrode 13 for shielding the sensor electrode 3 and the reference sensor electrode 15 against occurring interference is arranged in the region of the vehicle structure 11 designed as a frame of the vehicle door 12. Alternatively, the shielding electrode 13 can also be designed as a shielding cable with an electrical conductor, for example a copper conductor, and an electric insulator surrounding the latter, for example a plastic or rubber insulator.

When using the shielding electrode 13, the sensor electrode 3 and the reference sensor electrode 15 are, for example, not coupled to the electrical ground potential GND via the capacitors 9, 19. The shielding electrode 13 is in particular coupled to the ground potential GND and is arranged in particular between the sensor electrode 3 and the edge of the opening O.

The detection of an imminent trapping event takes place in the illustrated exemplary embodiment of the device 1 analogously to the detection described according to FIG. 1, wherein the shielding electrode 13 effects a directed, in particular downwardly directed measuring region and shielding against interference occurring on a side averted from the measuring region. This makes the device 1 insensitive to interference.

FIG. 5 shows a flow diagram of one possible exemplary embodiment of a method for detecting a trapping event of a motor-actuatable closing system of a vehicle 2.

Firstly, in a first method step S1, the charging phase is carried out by applying a positive electrical potential to the reference sensor electrode 15 via the control pin 18 so that negative charges migrate onto the reference sensor electrode 15. Simultaneously, the electrical potential of the reference sensor electrode 15 and a resulting distribution of the negative charges on the reference sensor electrode 15 are measured on the measuring pin 16.

It is checked at a first junction V1 whether the electrical potential measured at the measuring pin 16 has reached the predefined threshold. If this is not the case, illustrated by a No branch N1, the charging phase continues.

If the electrical potential measured at the measuring pin 16 has reached the predefined threshold, illustrated by a Yes branch J1, the control unit 5 applies the electrical ground potential GND to the control pin 18 in a second method step S2, so that the discharging phase starts and negative charges and positive charges flow back from the reference sensor electrode 15. Here, the control unit 5 detects the period of time from reaching the threshold to reaching the minimum threshold of the electrical potential produced by the back flow of the charges. A timer reset is effected before beginning the discharging phase.

The discharging phase is carried out until the minimum threshold is reached. In a second junction V2, the control unit 5 checks whether the minimum threshold had been reached. If this is not the case, illustrated by a No branch N2, the timer is incremented in a third method step S3.

If, by contrast, the minimum threshold has been reached, illustrated by a Yes branch J2, a timer value, i.e., the measured period of time, is equated to a residual charge quantity in a fourth method step S4.

Subsequently, in a fifth method step S5, an asymmetric filtering of the timer value is performed by means of an asymmetric low-pass filter, whereby shortening the discharge time is weighted more strongly and thus a relationship to a distance of a detectable object can be established.

Subsequently, the method steps S1 to S5 are performed analogously for the sensor electrode 3 and a correspondingly filtered timer value T2, i.e., a period of time of the discharge, is formed.

As soon as the filtered timer value T1 for the reference sensor electrode 15 and the timer value T2 for the sensor electrode 3 are available, a difference value is formed in a sixth method step S6 between the two timer values T1, T2, i.e., between the period of time detected for the sensor electrode 3 and the period of time detected for the reference sensor electrode 15 until the minimum threshold of the electrical potential is reached. In this case, the timer value T1 of the reference sensor electrode 15 is subtracted from the timer value T2 for the sensor electrode 3.

It is checked in a junction V3 whether the difference value is constantly negative, i.e., the timer value T1 of the reference sensor electrode 15 is constantly greater than the timer value T2 for the sensor electrode 3 is. If this is the case, illustrated by a Yes branch J3, an offset calculation is carried out in a seventh method step S7 and a calibration of the reference sensor electrode 15 is carried out by means of this.

If the difference value is positive or constantly negative, i.e., if the timer value T1 of the reference sensor electrode 15 is less than the timer value T2 for the sensor electrode 3, illustrated by a No branch N3, the difference value is filtered by means of a low-pass filter in an eighth method step S8.

Subsequently, it is checked in a further junction V4 whether the difference value exceeds the predefined threshold. If this is the case, illustrated by a Yes branch J4, an object is detected in a ninth method step S9 and it is inferred that a trapping event is imminent. If this is not the case, illustrated by a No branch N4, the method is restarted according to a method step S10.

Because the filtering of the timer values T1, T2 at the discharge times is identical for the two electrodes, identical values result in the case of constant environmental properties. This means that if the discharge times of the reference-sensor electrode 15 and the sensor electrode 3 are identical, it can be inferred that there is no object in the trapping region.

FIG. 6 shows a flow diagram of one possible exemplary embodiment of a method for preventing a trapping event of a motor-actuatable closing system of a vehicle 2, in particular a window pane.

This method immediately follows on from the ninth method step S9 of the method illustrated in FIG. 5, wherein it is checked in a junction V5 whether a window closing signal F is present. If this is not the case, illustrated by a No branch N5, the method according to FIG. 5 is restarted.

If, however, there is a window closing signal F and an object has already been detected, illustrated by a Yes branch J5, it is checked in another junction V6 whether a window pane position POS an upper pane edge is located in a critical region K, illustrated in more detail in FIG. 7. If this is not the case, illustrated by a No branch N6, the method jumps back to the previous junction V5 and the check for the presence of the window closing signal F.

If, by contrast, the window pane position POS is in the critical region K, illustrated by a Yes branch J6, in an eleventh method step S11 a movement of the window pane is stopped or reversed in order to prevent a trapping event.

FIG. 7 shows a vehicle door 12 with an opening O designed as a window opening and a closure element 4 designed as a window pane, wherein the vehicle door 12 is designed corresponding to the vehicle door 12 illustrated in FIG. 4. A critical region K is shown below an upper edge of the opening O, wherein a lower edge of the critical region K represents that region in particular in which a trapping event is likely between an upper edge of the window pane and the upper edge of the opening O.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A device for detecting a trapping event of a motor-actuatable closing system of a vehicle, the device comprises:

a sensor electrode at least partially surrounding an edge of a vehicle opening closable by a closure element, wherein the sensor electrode is arranged in a sealing element at least partially surrounding the opening;

a reference sensor electrode at least partially surrounding the edge of the opening of the vehicle, wherein the reference sensor electrode is arranged spaced apart from the sensor electrode in the sealing element and has a greater spacing from the opening than the sensor electrode; and a control unit configured to apply an electrical potential to the sensor electrode for a charging process and to apply a ground potential to the reference sensor electrode for a discharging process, detect, for the charging process, a first period of time until a first minimum threshold for an electrical potential for the sensor electrode is reached, and detect, for the discharging process, a second period of time until a second minimum threshold for an electrical potential for the reference sensor electrode is reached, wherein the first and second minimum thresholds are produced by a back flow of charges across the ground potential, determine a difference between the first and second periods of time detected, and infer that a trapping event is imminent if the determined difference between the first and second periods of time exceeds a predefined threshold and if the first period of time detected for the sensor electrode deviates from a predefined standard period of time or deviates from a standard period of time detected in a state that has been detected without an imminent trapping event.

2. The device of claim 1, wherein the control unit is further configured to carry out the charging process and the discharging process for the sensor electrode and the reference sensor electrode periodically staggered in such a way the charging process and discharging process of the sensor electrode are started after the charging process and discharging process of the reference sensor electrode have been completed or vice versa.

3. The device of claim 1, wherein the sensor electrode is arranged in an inner sealing lip of the sealing element and the reference sensor electrode is arranged in an outer sealing lip of the sealing element.

4. The device of claim 1, wherein the control unit and the sensor electrode are coupled to a first measuring pin, the control unit and the reference sensor electrode are coupled to a second measuring pin, the control unit is coupled to a first control pin and the sensor electrode is coupled to the first control pin via a first high-impedance electrical resistor, the control unit is coupled to a second control pin and the reference sensor electrode is coupled to the second control pin via a second high-impedance electrical resistor, the control unit is configured to apply a respective electrical potential to the sensor electrode and the reference sensor electrode via the first control pin and the second control pin, simultaneously measure the electrical potential of the sensor electrode and a distribution of negative charges on the sensor electrode at the first measuring pin, simultaneously measure the electrical potential of the reference sensor electrode and a distribution of negative charges on the reference sensor electrode at the second measuring pin, apply, as soon as the electrical potentials measured at the first and second measuring pins reach a respectively predefined threshold, the electrical ground potential to the control pins so that the charges flow back from the sensor electrode and the reference-sensor electrode, and detect a respective period of time from reaching the threshold up to reaching a respective minimum threshold of the electrical potential for the sensor electrode and the reference sensor electrode produced by the back flow of the charges.

5. The device of claim 1, wherein the sensor electrode and the reference sensor electrode are each coupled to the ground potential via a respective electric capacitor.

6. The device of claim 1, wherein the sensor electrode and the reference sensor electrode are each a respective sensor cable with an electrical conductor and electrical insulation surrounding the electrical conductor.

7. The device of claim 1, further comprising:

a shielding electrode, configured to shield the sensor electrode and the reference-sensor electrode from interference, arranged in a vehicle frame element or vehicle roof rail at least partially surrounding the opening.

8. The device of claim 1, wherein the control unit is further configured to infer that a trapping event is imminent if, additionally, when a closing movement of the closure element is activated, it is determined that the closure element is located in a predefined critical region.

9. A method for detecting a trapping event of a motor-actuatable closing system of a vehicle using a device comprising a sensor electrode and a reference sensor electrode, wherein the sensor electrode at least partially surrounds an edge of a vehicle opening closable by a closure element, wherein the sensor electrode is arranged in a sealing element at least partially surrounding the opening, wherein the reference sensor electrode at least partially surrounding the edge of the opening of the vehicle, wherein the reference sensor electrode is arranged spaced apart from the sensor electrode in the sealing element and has a greater spacing from the opening than the sensor electrode, the method comprising:

applying an electrical potential to the sensor electrode for a charging process and to apply a ground potential to the reference sensor electrode for a discharging process, detecting, for the charging process, a first period of time until a first minimum threshold for an electrical potential for the sensor electrode is reached;

detecting, for the discharging process, a second period of time until a second minimum threshold for an electrical potential for the reference sensor electrode is reached, wherein the first and second minimum thresholds are produced by a back flow of charges across the ground potential;

determining a difference between the first and second periods of time detected, and inferring that a trapping event is imminent if the determined difference between the first and second periods of time exceeds a predefined threshold and if the first period of time detected for the sensor electrode deviates from a predefined standard period of time or deviates from a standard period of time detected in a state that has been detected without an imminent trapping event.

10. A device for preventing a trapping event of a motor-actuatable closing system of a vehicle, the device comprising:

a device for detecting a trapping event of a motor-actuatable closing system of a vehicle, the device for detecting comprising a sensor electrode at least partially surrounding an edge of a vehicle opening closable by a closure element, wherein the sensor electrode is arranged in a sealing element at least partially surrounding the opening;

a reference sensor electrode at least partially surrounding the edge of the opening of the vehicle, wherein the reference sensor electrode is arranged spaced apart from the sensor electrode in the sealing element and has a greater spacing from the opening than the sensor electrode; and a control unit configured to apply an electrical potential to the sensor electrode for a charging process and to apply a ground potential to the reference sensor electrode for a discharging process, detect, for the charging process, a first period of time until a first minimum threshold for an electrical potential for the sensor electrode is reached, and detect, for the discharging process, a second period of time until a second minimum threshold for an electrical potential for the reference sensor electrode is reached, wherein the first and second minimum thresholds are produced by a back flow of charges across the ground potential, determine a difference between the first and second periods of time detected, and infer that a trapping event is imminent if the determined difference between the first and second periods of time exceeds a predefined threshold and if the first period of time detected for the sensor electrode deviates from a predefined standard period of time or deviates from a standard period of time detected in a state that has been detected without an imminent trapping event; and a further control unit configured to control, responsive to inferring that the trapping event is imminent, a motor drive of the closure elements to stop reverse a closing movement of the closure element.

* * * * *